United States Patent [19]

Danziger

[11] Patent Number: 5,391,006
[45] Date of Patent: Feb. 21, 1995

[54] SNAP ON ERGONOMIC KEYCAPS

[76] Inventor: Paul Danziger, 11807 Bunker Hill Cir., Houston, Tex. 77024

[21] Appl. No.: 109,529

[22] Filed: Aug. 20, 1993

[51] Int. Cl.⁶ ............................................... B41J 5/16
[52] U.S. Cl. ...................................... 400/488; 400/490
[58] Field of Search ............... 400/488, 489, 490, 492, 400/495

[56] References Cited

U.S. PATENT DOCUMENTS

| | | | |
|---|---|---|---|
| 4,012,127 | 3/1977 | Bolander | 400/490 |
| 4,483,634 | 11/1984 | Frey et al. | 400/488 |
| 4,597,681 | 7/1986 | Hodges | 400/488 |
| 4,755,072 | 7/1988 | Hoornweg | 400/490 |
| 5,119,078 | 6/1992 | Grant | 400/488 |
| 5,160,919 | 11/1992 | Mohler et al. | 400/489 |
| 5,183,346 | 2/1993 | Tesar | 400/490 |

*Primary Examiner*—Edgar S. Burr
*Assistant Examiner*—Anthony H. Nguyen
*Attorney, Agent, or Firm*—Mom, Pop & Henry

[57] ABSTRACT

This invention relates to ergonomic keycaps that snap on the keys or attach directly to the keyboard of computer keyboards, word processors, electronic typewriters and other data input devices. The ergonomic keycaps are approximately the same length and width as a standard keycap but are a different height. The ergonomic keys will be positioned over the data entry keys of a computer keyboard in a manner that forms an inverted V or a wave shape. The inverted V or wave shape allows the operator's hands to be maintained in a position that should reduce repetitive stress injuries. The snap on ergonomic keycaps may be formed from flexible plastic and are designed to fit snugly onto the standard data entry keys of a keyboard. The caps design will be cup shaped and a sufficient fixation to the keys may be achieved through friction forces, vacuum forces, a combination of friction and vacuum forces, a mechanical attachment or any other suitable means know to those skilled in the industry. While intending the ergonomic keycaps to be affixed strongly to each data entry key of the computer keyboard, in one embodiment, the ergonomic keycaps may not be permanently attached and therefore may be removable.

4 Claims, 6 Drawing Sheets

SNAP ON ERGONOMIC KEYCAPS

FIELD OF THE INVENTION

The present invention relates generally to keyboards and more particularly to ergonomically designed keycaps for use with computers, electronic typewriters and other electronic data input devices.

BACKGROUND OF THE INVENTION

The present invention relates to keycaps for computer keyboards, electronic typewriters, data entry units, and other similar apparatus. In particular this invention provides a number of varied height keycaps that when placed on a standard QWERTY keyboard positions the fingers and hands in an ergonomic position. The keycaps are positioned on the keyboard in such a manner that they form an inverted V or wave shape. The keycaps on the far left of the keyboard are generally shorter, with keycaps getting higher towards the center, and then shorter towards the right side of the keyboard.

The present invention places the hands a more natural hand and arm position when typing and thereby reduces repetitive stress injuries (RSI) such as carpal tunnel syndrome (CTS), flexor tendinitis, extensor tendinitis, and DeQuervain's disease.

Frequent use of a conventional horizontal keyboard results in injuries due to the unnatural angle the hands are required to assume to operate the keyboard when typing. An operator of a conventional horizontal keyboard must rotate his arms so as to dispose his hands are in a palms-down position, by pronation, and align his fingers with the rows of keys by twisting each hand outward at the wrist, by ulnar deviation. Conventional horizontal keyboards result in the operator's arm and hand muscles operating outside their natural and ideal range, and thus functioning poorly and increasing risks of injury. Tendons and nerves are adversely affected and over time this abuse can lead to repetitive stress injuries. For example, an operator of a conventional horizontal keyboard often types with bent wrists, resulting in irritation and bunching of the sheaths surrounding the tendons. This bunching affects the sensitive median nerve in the carpal tunnel, and may lead to carpal tunnel syndrome (CTS). Symptoms of CTS are "shooting" pains from the wrists to the forearms, palms or fingers. In extreme cases, CTS and other RSI are permanently debilitating. In a significant number of cases, repetitive stress injuries force keyboard operators or other workers which frequently use a keyboard to an alternative type of employment that does not require use of a keyboard.

Computer keyboard injuries annually afflict about 185,000 office and factory workers and cost companies about $20 million. Presently, annual worker's compensation payments for these injuries is approximately $1.1 billion. The competitive advantages of data processing indicate that computer use, and therefore the number, frequency and cost of repetitive stress injuries due to conventional keyboards, is certain to increase. Over the last decade the number of employees using conventional computer keyboards in the United States has increased from approximately 5 million to 50 million. In total, there are presently about 120 million keyboard operators in the United States. To reduce the occurrence of CTS and other repetitive stress injuries, a keyboard should alleviate the underlying causes of repetitive stress injuries.

Such an improved keyboard, which is realized in the present invention, must relieve muscle and tendon strain, lessen or reduce wrist deviation, reduce or eliminate forearm pronation, reduce the distance fingers must travel and lessen the force necessary to the keys. Dr. David Thompson, a professor emeritus at Stanford University has found that muscles worked less with hands typing on an angled keyboard on a 30 degree tilt and significantly less with a 60 degree tilt. Dr. Thompson stated that it took about 40 percent more muscle effort to type on a flat linear keyboard than on a keyboard with a 60 degree tilt. Additionally, muscles worked less with straight wrists than when the wrists are bent. Dr. Thompson explained that the harder muscles work the more likely they are to become overworked and this increases the possibility the user will become fatigued, as well as the likelihood that repetitive stress injuries may occur.

A number of prior art keyboard designs have been proposed in an attempt to reduce RSI. This is seen in, for example, U.S. Pat. Nos. 4,378,553 to McCall and 4,661,005 to Lahr, which disclose a design where the conventional QWERTY keyboard layout is split into two separate pieces, allowing the operator to space each horizontal keypad at a comfortable interval. Other designs angle a horizontal planar keyboard into a V shape or chevron design as illustrated by U.S. Pat. Nos. 5,156,475 to Zilberman and 5,129,747 to Hutchison. Other designs split the keyboard and rotate each split half of the keypad into a vertical position as disclosed in U.S. Pat. Nos. 5,160,919 to Mohler and 5,137,384 to Spencer. These designs purport to reduce wrist deviation and hand pronation.

U.S. Pat. No. 4,597,681 to Hodges discloses an "Adjustable Keyboard" divided into two sets of keys that are adjustable relative to each other in both a horizontal and vertical manner. FIGS. 3 and 4 of Hodges indicates that the split keyboard may be pivotally adjusted to form an inverted V. Another keyboard design is disclosed in U.S. Pat. No 5,067,834 to Szmand which discloses an "Input Keyboard Apparatus for Information Processing Device and Other Keyboard Devices." The input keyboard of Szmand includes a left and right keyboard each mounted on a telescopic shaft attached to a base support plate. The two keyboards form a generally inverted V shaped spacing with each keyboard having a front-to-back inclination and a lateral side inclination with universal pivots permitting individual settings for an operator. The keyboard connecting pivot unit is releasable to allow lateral spacing of the keyboard.

Snap on keys have been used in prior art. This is seen in, for example, U.S. Pat. No. 4,755,072 to Hoornweg, which discloses removable transparent colored key caps for color coding a keyboard. These colored transparent keycaps fit over the keys of a keyboard enabling a subset of keys to be distinguished by color while maintaining visibility of the key designation. All the keys of Hoorneg's design of are of uniform height. U.S. Pat. No. 5,183,346 to Tesar discloses a similar design. Tesar uses snap on keys to convert symbols on a computer keyboard to another set of graphic symbols. This is used with computer software programs that enable the an operator to type in a number of different languages. Rather than replacing the keyboard, snap on keycaps specific to a one particular language will be placed on the data entry keys of the keyboard of another language. For example, snap on keycaps showing the graphic symbols of the Thai language may be placed over the computer keyboard that comes standard with English keycaps. Once again all the keys of Tesar's design are uniform or the same height.

No prior art designs use a variety of different height keycaps to convert a horizontal keyboard into an ergonomic keyboard. Rather the keyboard must be redesigned. As there are approximately 120 million horizontal computer keyboards in the U.S. a simple, cheap and efficient method or transforming existing horizontal keyboard into an ergonomic keyboard is developed in the present invention through the use of snap on ergonomic keycaps. Consequently, the benefits of these designs can be obtained without having to purchase a new redesigned computer keyboard.

SUMMARY OF THE INVENTION

An object of the present invention is to provide a variety of different height keycaps that can be placed on a convention horizontal keyboard to convert the convention horizontal keyboard into an ergonomic keyboard. As should be evident, the present invention may be also be used in conjunction with other keyboard formats such as Dvorak, military electronics key combinations, aerospace input keys, scientific input keys and diagnostic input keys.

Another object of the invention is to provide ergonomic keycaps that allows for substantially ergonomic positioning of the hands and wrists in order to reduce the risk of repetitive stress injuries. Accordingly, a keyboard in conjunction with ergonomic keycaps of the invention allows the hands to assume a "natural position", substantially facing together, with the thumbs up and the wrists in a substantially neutral and relaxed arc. The ergonomic keycaps will avoid and alleviate the problems associated with horizontal keyboards which demand a pronated palm hand position and ulnar deviation of the wrist that has been scientifically associated with carpal tunnel syndrome and repetitive stress injuries.

Another object of the invention is to avoid having individual operators incur the expense of purchasing a new keyboard to obtain ergonomic positioning of their hands. Rather, individuals can purchase the ergonomic keycaps, snap them onto the data entry keys on their conventional horizontal keyboard and convert what once was a conventional horizontal keyboard into a ergonomic keyboard.

Another object of this invention is to allow manufacturers of conventional horizontal keyboards to avoid having to redesign and retool to make an ergonomic keyboard. Rather, manufacturers can make ergonomic keycaps that will attach directly to the base plate or to mechanical keyswitches of the keyboard. This will allow manufacturers to offer either a conventional horizontal keyboard or an ergonomic keyboard through the use of snap on ergonomic keycaps.

Another object of this invention is to provide ergonomic keycaps that are adjustable in horizontal, vertical and angular manner so the operator can customize certain keys to make them easier to reach or for any other personal preference. Individuals will be able to increase or decrease the height of the keycap to obtain maximum comfort and ergonomic effect.

Another object of this invention is to provide ergonomic keycaps that have a spring or absorbing system in them to absorb the pressure when a typist presses down to hard on a key and by doing so reduce keyboard injuries. Originally, typewriters had a spring mechanism that absorbed pressure when an operator pressed too hard on a key. A typist that presses too hard on a key on a standard computer keyboard hits a solid plastic base that in no way absorbs or reduces the pressure. These ergonomic keycaps will have a system that absorbs the pressure and reduces these types of injuries.

Another object of this invention is to provide a removable template composed of different height ergonomic keycaps that will be removable from the horizontal keyboard. This will allow the operator to remove the whole template which would include all the ergonomic keycaps when the operator has finished typing. Employees working on shifts at a different computer stations would be able to simply remove the template without having to remove each keycap.

BRIEF DESCRIPTION OF THE DRAWINGS

Other objects and advantages of the invention will be apparent from the following detailed description and upon reference to the drawings, in which:

FIG. 6c shows the actuator switch onto which a fixed or adjustable snap on keycap is snapped onto or attached to.

DETAILED DESCRIPTION OF THE INVENTION

While the present invention is susceptible to various modifications and alternative forms, specific embodiments thereof are disclosed by way of example in the drawings and will herein be described in detail. It should be understood, however, that it is not intended to limit the invention to the particular form disclosed, but on the contrary, the intention is to cover all modifications, equivalents, and alternatives falling within the spirit and scope of the invention as defined by the appended claims.

In particular, the following description refers to a specific embodiment of the present invention when used as a QWERTY format snap on ergonomic keycap device. However, the keycaps may be used with other keyboard formats such as Dvorak, military electronics key combinations, aerospace input keys, scientific input keys and diagnostic input keys. Thus, the present invention may easily be adapted for use in a variety of data input devices.

Figure 1:
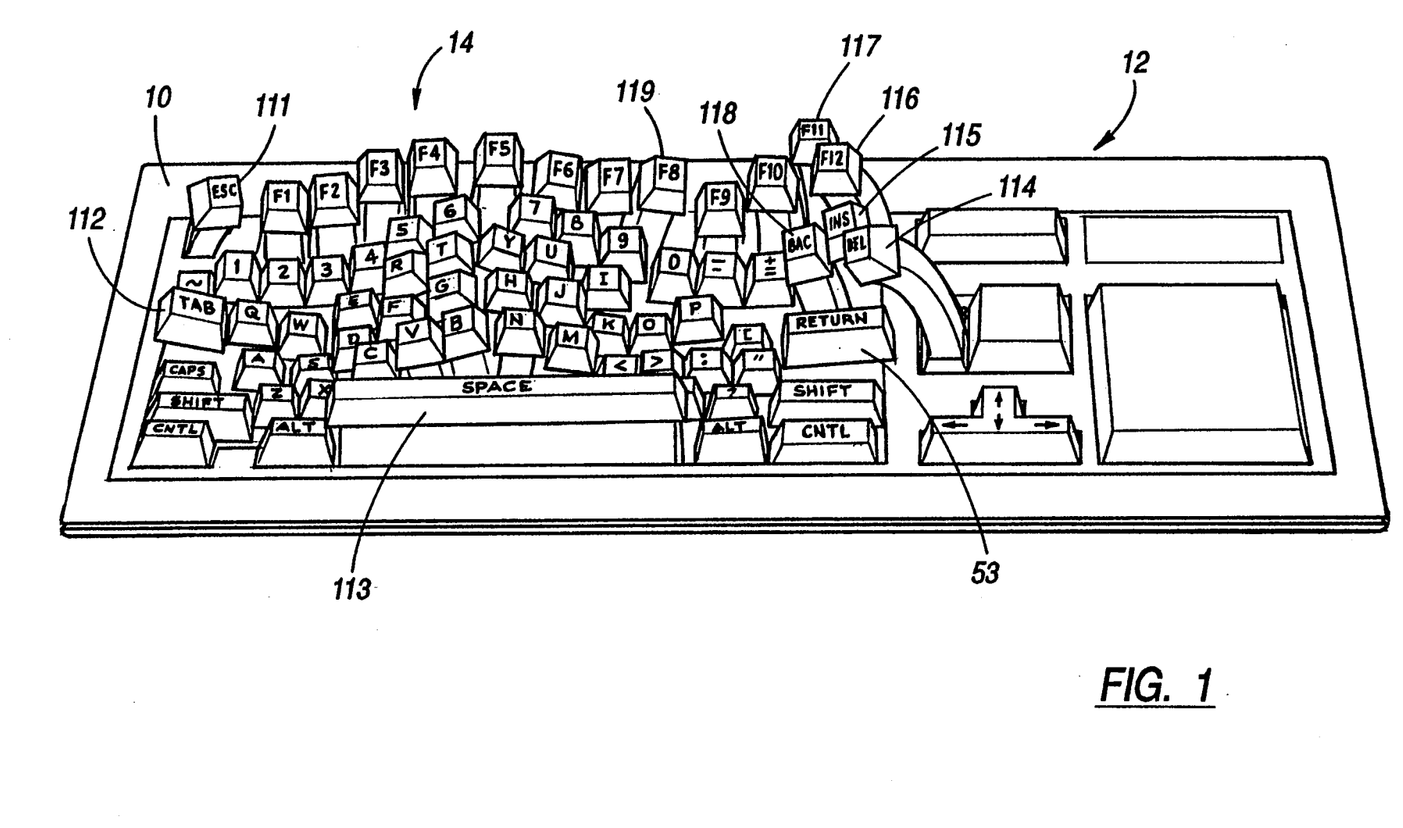
FIG. 1 is a perspective view of the keyboard with the ergonomic keycaps attached to form an inverted V or wave shape.

Turning now to the drawings and referring first to FIG. 1, there is illustrated a preferred embodiment of the invention, which is comprised of a standard horizontal keyboard 10 with "snap on" keycaps 12 affixed in an inverted V or wave shape 14 for ergonomic effect. The "snap on" keycaps can either be placed directly over a standard data entry key or the data entry key can be removed and the "snap on" keycap can be used as a replacement attaching directly to the keyboard.

Figure 2:
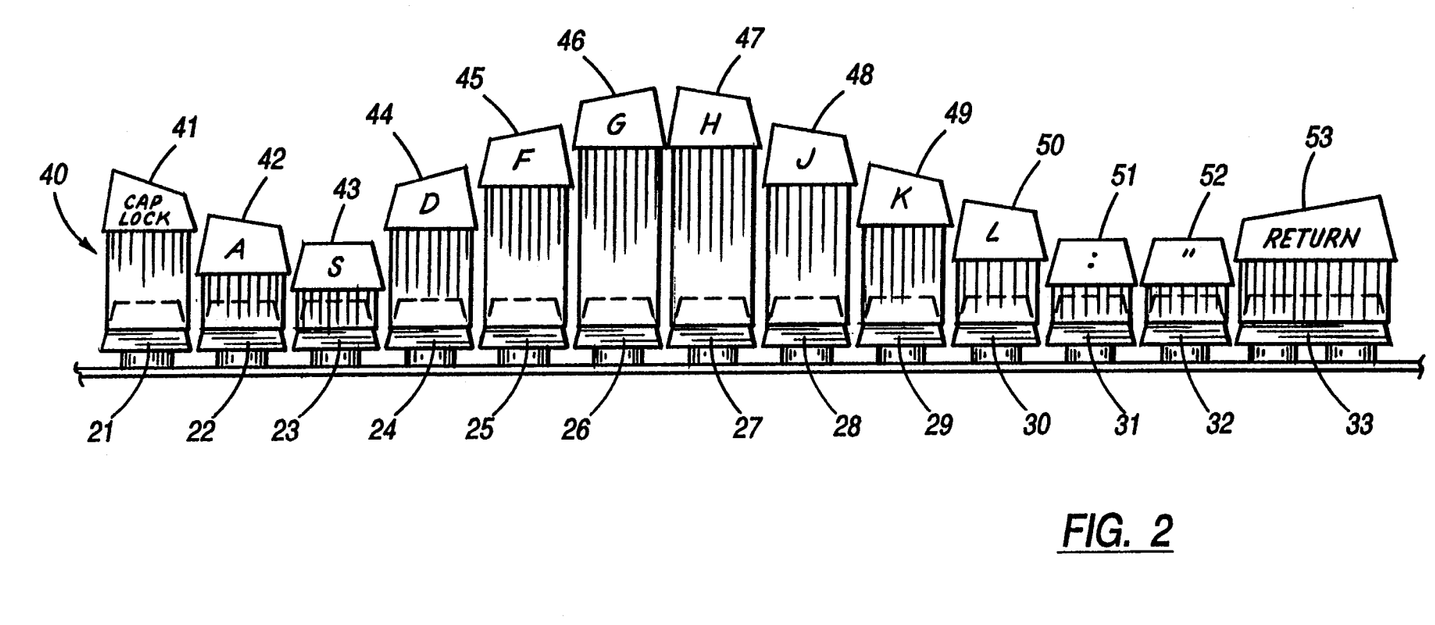
FIG. 2 is a front elevational view of a typical row of data entry keys with the ergonomic snap on keycaps attached. This figure shows the range in heights required to achieve this shape.

Turning now to FIG. 2, there is illustrated one row of affixed snap on keycaps 40. The affixed snap on keycaps 41–53 are placed over the standard keyboard data entry keys 21–33. On the far left the "CAP LOCK" data entry key 21 has a keycap 41 attached to it or snapped onto it. Progressing along the row the snap on "A" keycap 42 is lower than the snap on "CAP LOCK" keycap 41. The snap on "S" keycap 43 is lower than the snap on "A" keycap 42. The snap on "D" keycap 44 is higher than both the snap on "S" keycap 43 and snap on "A" keycap 42. The snap on "F" keycap 45 is higher than the previous snap on "D" keycap 44. The snap on "G" keycap 46 is higher than the snap on "F" keycap 45 and on this row the snap on "G" keycap 46 is the highest key for actuation by the left hand. Continuing along the row the snap on "H" keycap 47, to be actuated by the right hand, is at substantially the same height as the previous snap on "G" keycap 46. The snap on "J" keycap 48 is lower than snap on "H" keycap 47. The snap on "K" keycap 49 is lower than the snap on "J" keycap 48. The snap on "L" keycap 50 is lower than the snap on "K" keycap 49. The snap on ":/;" keycap 51 and the snap on "'/"" keycap 52 are substantially at the same height. The snap on "RETURN" keycap 53 is elevated above the snap on ":/;" keycap 51 and snap on "'/"" keycap 52. The different heights of the various keycaps form an inverted V or wave shape which will maintain the hands in an ergonomic position.

Returning to FIG. 1 it can be seen that certain keys are elevated and positioned towards the center of the keyboard. As all the fingers on the hand are not the same length, certain keys such as "TAB" 112, "BACKSPACE" 118, "ESCAPE" 111 and "DELETE" 114 are raised and brought closer to the center of the keyboard so they may be actuated with less movement of the hands. This will reduce the muscle work, wrist deviation and help reduce repetitive stress injuries associated with the operator bending her hands into awkward positions. For example, having certain keys such as the "BACKSPACE" key 118 higher and angled slightly to the left reduces the need to bend the wrist in an awkward position to actuate the "BACKSPACE" key 118.

Figure 3A:
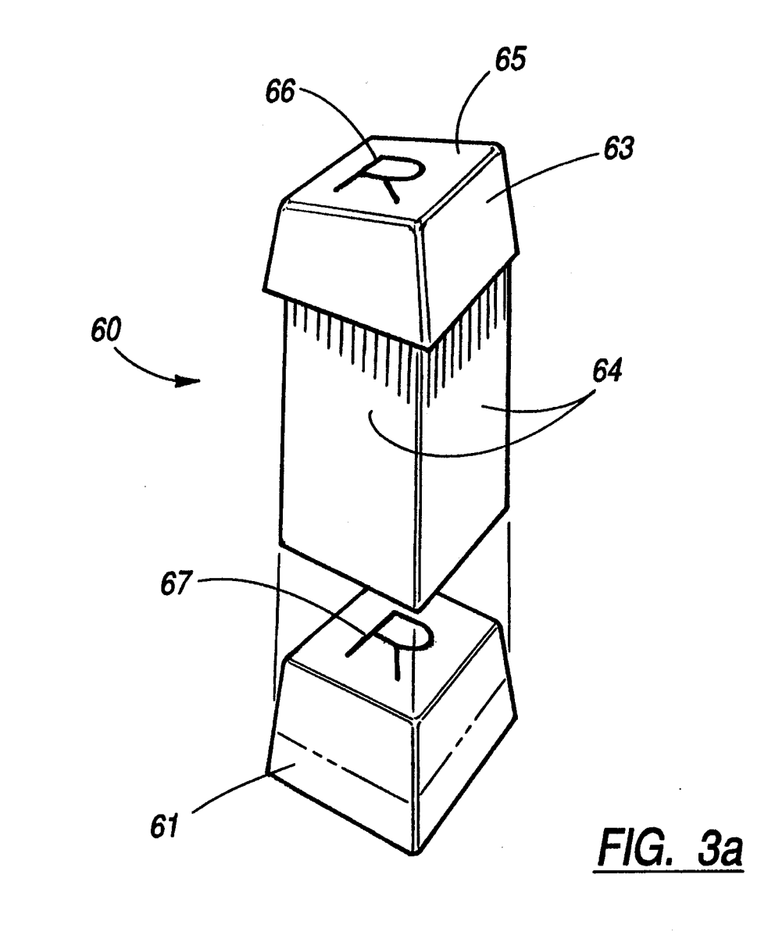
FIG. 3a is a perspective view of a snap on fixed height keycap installed onto a standard data entry key.
Figure 3B:
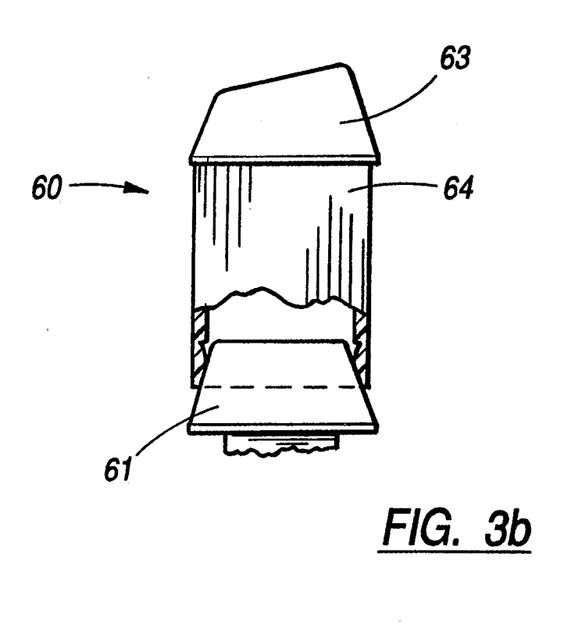
FIG. 3b is a partial section view through the assembled keycap showing method of fit. Fixed height keycaps will be available in a variety of heights.

FIGS. 3a and 3b shows one embodiment of the invention or a one piece fixed height snap on keycap 60. This fixed height keycap is composed of a top key piece 63 attached to a tubular casing 64. This type of keycap would not be adjustable in a horizontal, vertical and angular manner. The height of this keycap would remain fixed. The fixed height snap on keycaps could attach either directly to the data entry keys or attached to the base plate or actuator switch of the keyboard. FIG. 3a is a perspective view of a snap on style fixed height keycap 60 installed onto or snapped onto a standard key data entry key 61. The snap on keycaps could be attached in any manner known to those skilled in the industry. The side walls 64 of each snap on keycap extend downwardly and flare outwardly from the top rectangular surface 63 and are positioned over the top surface of the a data entry key 61. The top exterior surface 65 of the snap on keycap corresponds in size and shape to the top exterior surface of the data entry key over which it is positioned 61. The top exterior surface 65 of the snap on keycap has the same indica 66 as the indicia on the data entry key 67.

FIG. 3b is a partial section view through assembled keycap 60 showing method of fit over a data entry key 61. Fixed height keycaps will be available in a variety of heights and configurations.

Figure 4A:
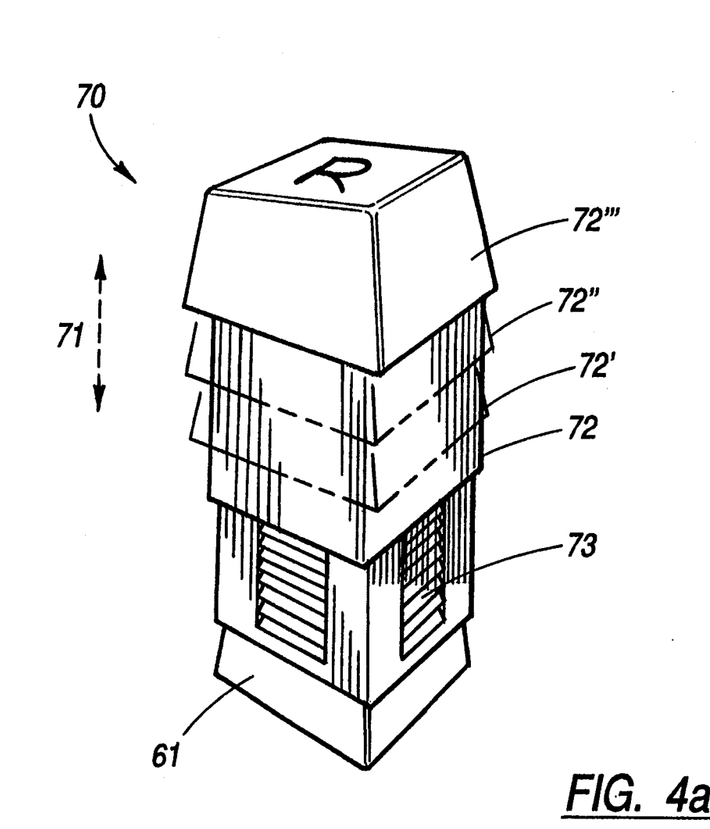
FIG. 4a is a perspective view of a "Telescopic" snap on keycap with multiple positions shown in phantom lines.
Figure 4B:
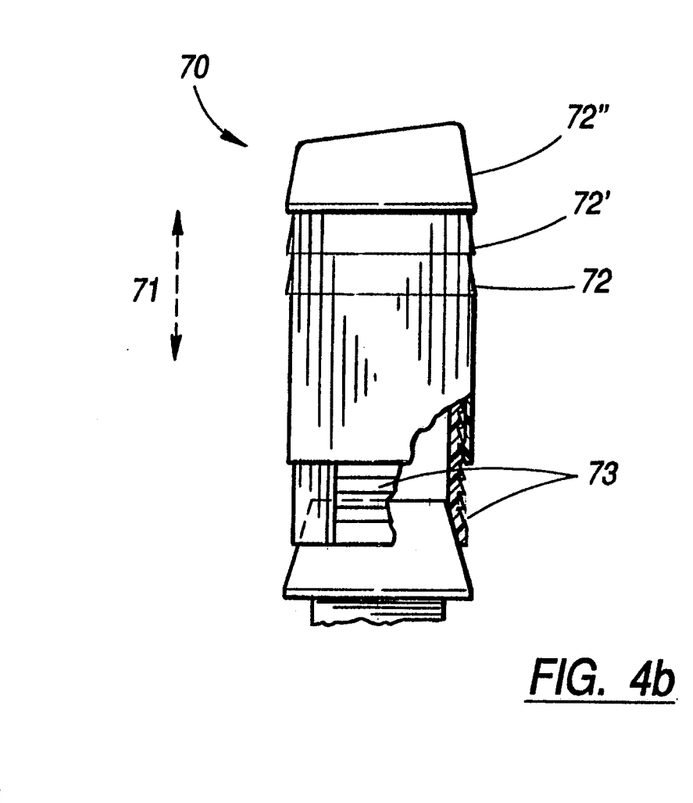
FIG. 4b is a partial section view through the "Telescopic" keycap showing method of ratcheting.

FIGS. 4 and 5 show another embodiment of the invention or an adjustable ergonomic keycap. FIGS. 4 and 5 demonstrate that this type of keycap would be able to move in a horizontal, vertical and angular manner. FIGS. 4a and 4b demonstrate how the adjustable ergonomic keycap 70 is "Telescopic" and can be moved up and down 71 in a vertical manner. FIG. 4a is a perspective view of a Telescopic snap on keycap with multiple positions 72, 72', 72", 72'" shown in phantom lines. One method of telescopic adjustment would be a ratcheting mechanism as shown 73. A single pair of tubes could be created and cut down to produce shorter or taller versions of different height keycaps such as those shown in FIG. 2. As described above under FIG. 1, the Telescopic style could be provided in straight, curved or angled orientation. Therefore, while FIG. 4 is a straight Telescopic fixed snap on keycap 70 it is possible that certain keys are curved or angled Telescopic snap on keycaps as seen in FIG. 1 with the "DELETE" 114 and "ESCAPE" 111 keys. FIG. 4b is a partial section view through the assembled keycap 70 showing method of ratcheting 73.

Figure 5A:
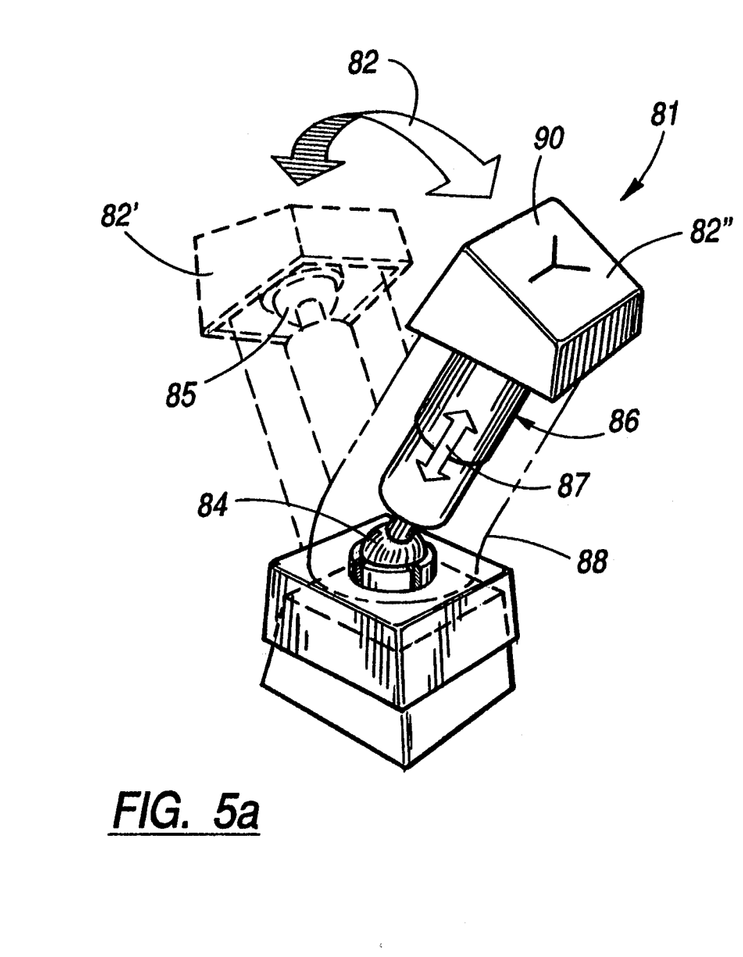
FIG. 5a is a perspective view showing an "Articulated" snap on style keycap.
Figure 5B:
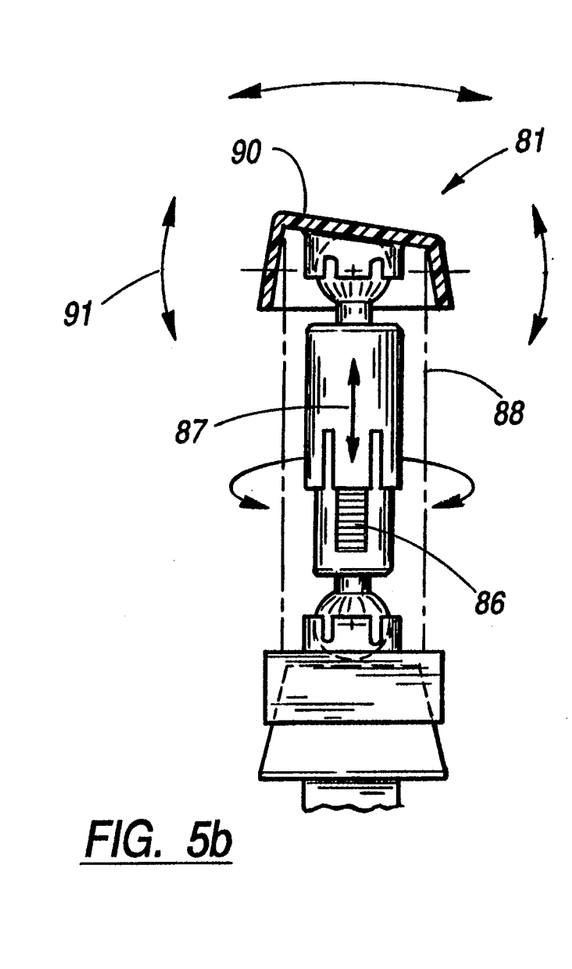
FIG. 5b is a partial section view through the "Articulated" keycap further showing construction details and degrees of freedom.

FIGS. 5a and 5b is a perspective view showing an "Articulated" snap on style keycap 81. FIG. 5a demonstrates how the adjustable ergonomic keycap can be moved back 82' and forth 82" in a horizontal manner 82. In one embodiment this Articulated style keycap could be constructed as shown with ball and socket joints at the base end 84 and top end 85 to allow the top key piece 90 to obtain the desired attitude 91. A ratcheting tubular body 86 could be provided for vertical adjustment 87 if desired or required. The body is shown surrounded by a flexing bellows shaped tube for support 88. This bellow tube 88 could also have a system that would allow it to absorb or reducing some of the impact when the operator presses or hits the data entry key. FIG. 5b is a partial section view through Articulated keycaps 81 further showing construction details and degrees of freedom. The snap on keycap 81 can move in X, Y, Z as well as rotation and tilt. The top keypiece 90 is also adjustable 91. These varied functions allows the operator to adjust the snap on keycaps' height and angle for the operators particular hand size and in a manner that positions the hand in an individually customized ergonomic position.

With the adjustable ergonomic keycaps the operator can customize the keyboard by extending, retracting or angling certain keys. Returning to FIG. 1 we can see that if the "DELETE" key 114 is used often then it can be extended up and to the left. This may be beneficial with software packages that require constant repetition by the operator of certain awkwardly placed keys. For example, if one is using the Wordperfect word processing software package and doing a significant amount of underlining, the "F8" key 119 would be brought towards the center keys. This would allow the operator to reduce hand movement when needing to actuate the underline or "F8" key 119. The "BACKSPACE" 118, "INSERT" 115 or any other key could be extended in a like manner to provide maximum comfort for the operator. Reducing hand movement diminishes the possibility the hands angles into positions that can cause repetitive stress injuries.

Figure 6A:
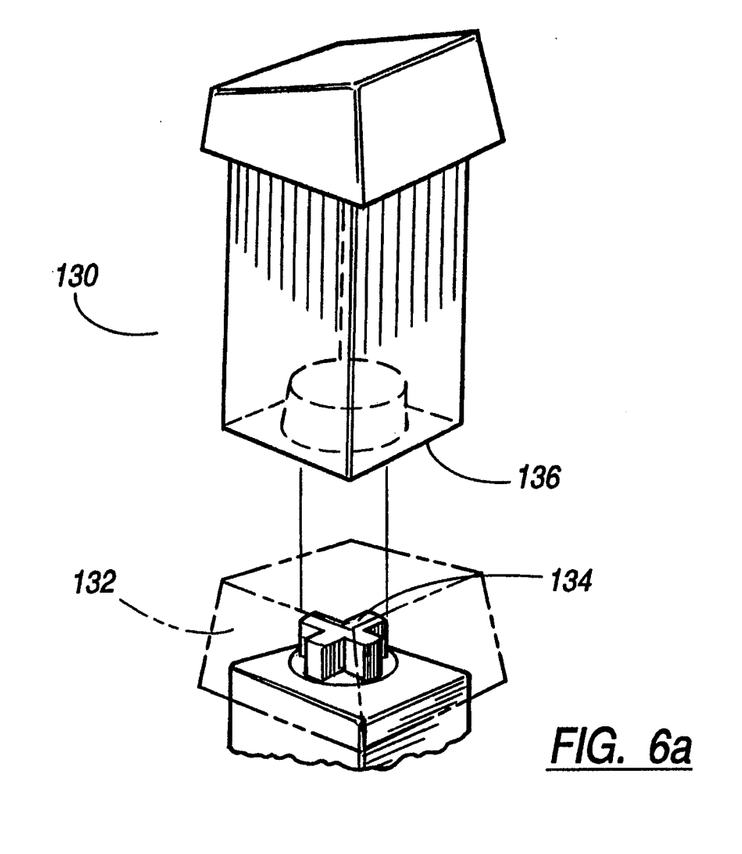
FIG. 6a is a perspective view of an alternative embodiment which allows for the snap on keycap to replace an existing standard key by attaching directly to the actuator switch or the keyboard base.

FIG. 6a shows a snap on keycap 130 that attaches directly to the keyboard's actuator switch 134. Some keyboards have no actuator switch so the snap on key would attach to the keyboard in a similar way that the original data entry key attached to the keyboard. In this embodiment the data entry key 132 is removed and replaced with the snap on keycap 130.

Figure 6B:
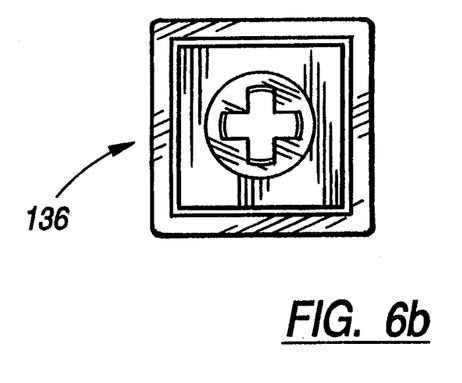
FIG. 6b shows the underneath or bottom part of the snap on keycap and demonstrates how it will fit over the actuator switch.

FIG. 6b show a bottom view or underneath side of the snap on keycap 136. The underneath side or casing fits over the actuator key switch 134 securing the snap on keycap 130 to the keyboard.

Figure 6C:
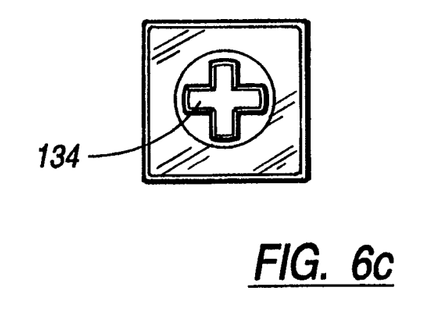

FIG. 6c shows a top view of the actuator key switch 134 onto which a fixed or adjustable keycap 130 is snapped onto or attached to. As seen in FIG. 6a the underneath portion 136 is placed over and positioned on the actuator key switch 134.

What is claimed is:

1. A keyboard with a plurality of keys adapted to electronically transmit keystroke information, said keyboard comprising:

a keypad where each keycap is fixed and nonadjustable and the "cap lock" keycap is higher than the "A" keycap, the "A" keycap is higher than the "S" keycap, the "D" keycap is higher than the "S" keycap, the "F" keycap is higher than the "D" keycap, the "G" keycap is higher than the "F" keycap, the "G" keycap is substantially the same height as the "H" keycap, the "H" keycap is higher than the "J" keycap, the "J" keycap is higher than the "K" keycap, the "K" keycap is higher than the "L" keycap, the "L" keycap is higher than the ":/;" and "'"/'"" keycaps and the "return" is higher than the ":/;" and "'"/'"" keycaps.

2. The keyboard as claimed in claim 1 wherein the keycaps are a one piece fixed nonadjustable keycaps of varied heights with both curved and straight extensions.

3. The keyboard as claimed in claim 1 wherein the keycaps are attached to the data entry keys of a conventional computer keyboard.

4. The keyboard as claimed in claim 1 wherein the keycaps are attached to the base plate or actuator switches of a conventional computer keyboard.

* * * * *